(12) United States Patent
Nagai et al.

(10) Patent No.: US 9,425,602 B2
(45) Date of Patent: Aug. 23, 2016

(54) BUSBAR

(71) Applicant: KAYABA INDUSTRY CO., LTD., Tokyo (JP)

(72) Inventors: Yuki Nagai, Kanagawa (JP); Taroh Matsumae, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/372,847

(22) PCT Filed: Jan. 15, 2013

(86) PCT No.: PCT/JP2013/050549
§ 371 (c)(1),
(2) Date: Jul. 17, 2014

(87) PCT Pub. No.: WO2013/118540
PCT Pub. Date: Aug. 15, 2013

(65) Prior Publication Data
US 2014/0360750 A1    Dec. 11, 2014

(30) Foreign Application Priority Data

Feb. 6, 2012  (JP) ................................. 2012-022864

(51) Int. Cl.
*H02G 5/02* (2006.01)
*H01R 12/57* (2011.01)
*H01R 12/70* (2011.01)
*H01R 43/02* (2006.01)

(52) U.S. Cl.
CPC .............. *H02G 5/025* (2013.01); *H01R 12/57* (2013.01); *H01R 12/7017* (2013.01); *H01R 43/0256* (2013.01); *H01R 43/0263* (2013.01)

(58) Field of Classification Search
CPC ..... H02G 5/025; H01R 12/7017; H01R 12/57
USPC ........................................................ 174/68.2
See application file for complete search history.

(56) References Cited

U.S. PATENT DOCUMENTS

| 6,162,091 | A | 12/2000 | Kurotori et al. | |
| 8,199,520 | B2 * | 6/2012 | Kishino et al. | ................ 361/775 |
| 2008/0248678 | A1 | 10/2008 | Tuerschmann et al. | |
| 2008/0286988 | A1 | 11/2008 | Yanai et al. | |

FOREIGN PATENT DOCUMENTS

| DE | 202010015731 U1 | 1/2011 |
| JP | 49-67148 U | 6/1974 |
| JP | 2003-079026 A | 3/2003 |
| JP | 2006310567 A | 11/2006 |
| JP | 2010-035304 A | 2/2010 |
| JP | 2011-204451 A | 10/2011 |
| JP | 2011-254647 A | 12/2011 |
| WO | WO 98-49756 A1 | 11/1998 |

OTHER PUBLICATIONS

Extended European Search Report dated Sep. 2, 2015.

* cited by examiner

*Primary Examiner* — Dhirubhai R Patel
(74) *Attorney, Agent, or Firm* — Rabin & Berdo, P.C.

(57) ABSTRACT

A bus bar including a bus bar pin that is mounted onto a circuit board, the bus bar including a base part that is disposed along the circuit board and supports the bus bar pin, and a pair of support columns that are formed at both ends of the base part and clamp the circuit board to fix the bus bar pin to the circuit board.

9 Claims, 6 Drawing Sheets

BUSBAR

TECHNICAL FIELD

The present invention relates to a bus bar that is mounted on a board and performs electrical connection.

BACKGROUND ART

In a circuit board on which an electronic circuit is mounted, for example, a metal bus bar that transmits and receives electric power and signals between a circuit board and another circuit board has been conventionally mounted on a circuit board. As a method for mounting a bus bar on a circuit board, JP2010-35304A discloses a surface-mounting bus bar in which one end of the bus bar is soldered to the surface of a circuit board. When using a plurality of bus bars, the plurality of bus bars are formed integrally by an insulating resin portion.

SUMMARY OF INVENTION

In the conventional technology disclosed in JP2010-35304A, when mounting the bus bar onto the board, a resin mold portion is prevented from moving on the board by inserting a pair of protrusions that protrude from a resin portion toward the circuit board side into through-holes formed in the circuit board.

In a soldering operation, e.g. reflow soldering, for mounting a bus bar onto a circuit board, heat at a high temperature suited to soldering is applied to the circuit board or bus bar. At this time, since the material properties of the resin portion and the circuit board differ, the thermal expansion coefficient of each also differs.

Therefore, if the resin portion is fixed to the circuit board such that it cannot move as explained above, the resin portion may deform relative to the circuit board due to the difference in the thermal expansion coefficients thereof. In particular, if the resin portion warps and deforms in a direction away from the circuit board, the bus bar that is fixed to the resin portion may rise up from the circuit board, and this may lead to defects in the soldering.

The present invention was developed in view of the above problem and aims to provide a bus bar for mounting onto a board in which defects in the soldering can be prevented.

According to an embodiment of the present invention, a bus bar including a bus bar pin that is mounted onto a circuit board is provided. The bus bar includes a base part that is disposed along the circuit board and supports the bus bar pin and a pair of support columns that are formed at both ends of the base part and clamp the circuit board to fix the bus bar pin to the circuit board.

Embodiments of the present invention and advantages of the present invention will be explained in detail below together with reference to the attached drawings.

DESCRIPTION OF EMBODIMENTS

Embodiments of the present invention will now be explained with reference to the drawings.

Figure 1A:
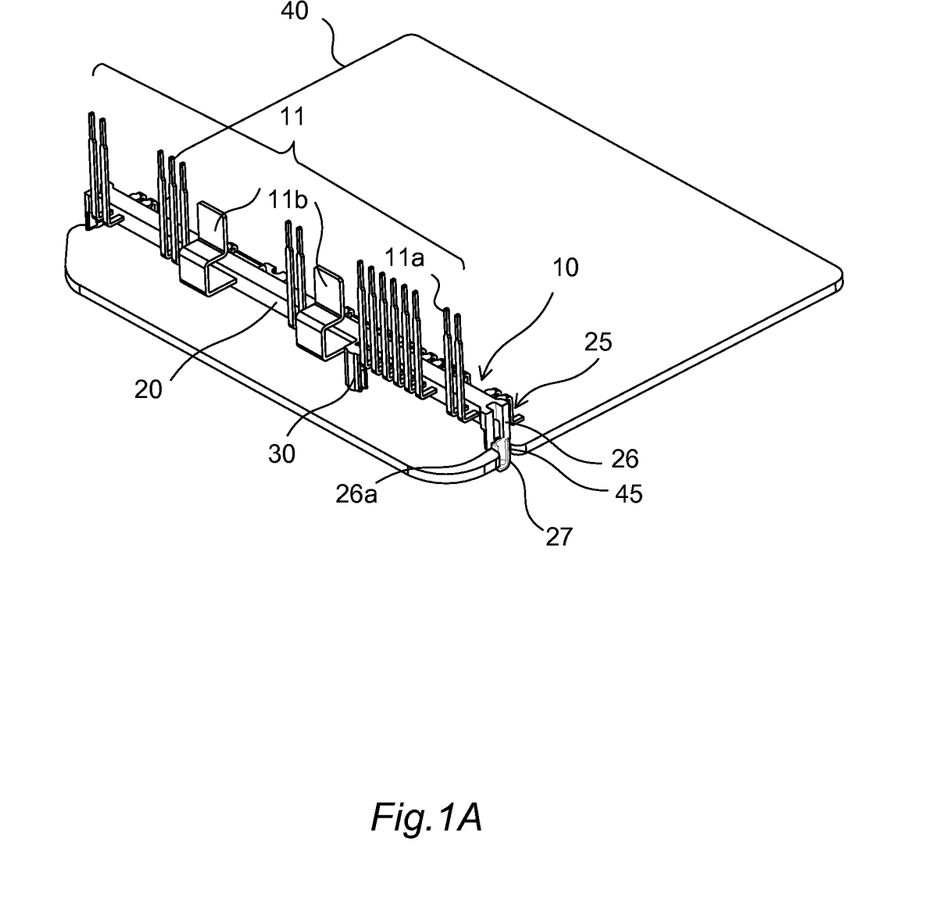
FIG. 1A is a schematic view of a circuit board onto which a bus bar is mounted of an embodiment of the present invention.
Figure 1B:
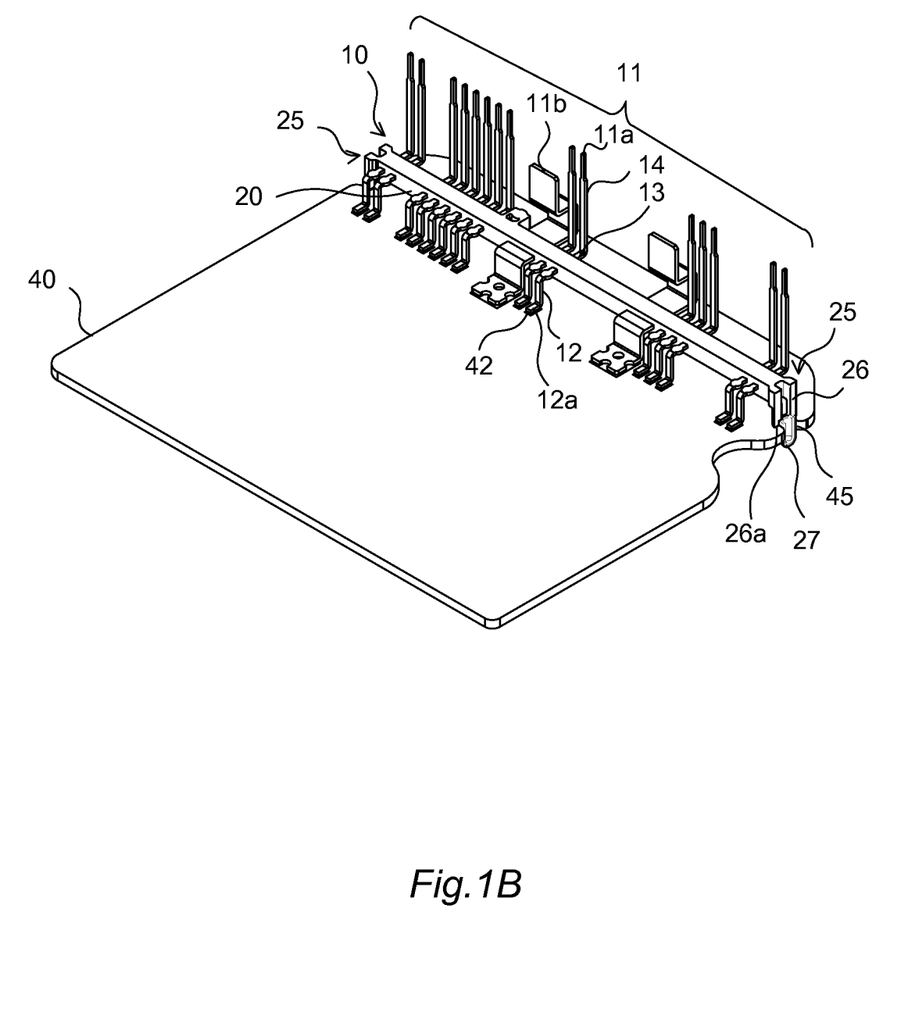
FIG. 1B is a schematic view of the circuit board onto which a bus bar is mounted of the embodiment of the present invention.

FIGS. 1A and 1B are explanatory views of a circuit board 40 onto which a bus bar 10 is mounted of an embodiment of the present invention. FIG. 1A is a schematic view of the side of the circuit board 40 onto which the bus bar 10 is mounted, and FIG. 1B is a schematic view of the side opposite to the side of the circuit board 40 onto which the bus bar 10 is mounted.

Circuit components such as electronic components and the bus bar 10 are mounted onto the circuit board 40. The electronic components are omitted from FIGS. 1A and 1B. The bus bar 10 is fixed to the circuit board 40 and mounted by soldering.

The circuit board 40 of the present embodiment is constituted by using a metal such as aluminum or copper as a base material and subjecting the surface thereof to an insulating treatment, circuit patterning, and the like. By constituting the base material with a metal as described above, the circuit board 40 exhibits increased thermal conductivity, and thus is suited to mounting electronic components that produce large amounts of heat such as power semiconductors and the like.

The bus bar 10 includes a plurality of bus par pins 11 that extend upwards in the vertical direction relative to the circuit board 40. When another circuit board or functional component is arranged above the circuit board 40, the bus bar pins 11 electrically connect to the other circuit board or functional component to transmit and receive signals and electric power between the circuit board 40 and the other circuit board or functional component.

The bus bar 10 is constituted by fixing the plurality of bus bar pins 11 to a base part 20. The base part 20 is constituted by, for example, a non-electrically conductive resin or the like, and is arranged along the surface of the circuit board 40. The plurality of bus bar pins 11 are integrally molded by the base part 20 made of resin, thereby constituting the bus bar 10. A pair of support columns 25 for fixing the bus bar 10 to the circuit board 40 is formed at both ends of the base part 20.

The bus par pins 11 are constituted by an electrically conductive metal such as copper or nickel. The bus bar pins 11 are subjected to a surface treatment suited for performing soldering. In the present embodiment, the bus par pins 11 include bus par pins 11a having a prismatic column-shaped cross section and bus bar pins 11b having a panel-shaped cross section. The bus bar pins 11b are used for transmitting and receiving larger amounts of electrical power than the bus bar pins 11a.

Each bus bar pin 11 is formed integrally by a vertical part 14 that extends upwards from the base part 20 in the vertical direction relative to the circuit board 40, a pin foot part 12 that extends downwards from the base part 20 in the vertical direction relative to the circuit board 40 side, and a connecting part 13 that connects the vertical part 14 and the pin foot part 12. A bottom part 12a that forms a surface that is approximately parallel to the circuit board 40 is formed at the bottom end of the pin foot part 12. The bottom part 12a is bonded by soldering to a land 42 disposed on the circuit board 40.

Each electrically conductive land 42 is disposed at a position on the circuit board 40 corresponding to the bottom part 12a of each pin foot part 12. Further, a pair of recesses 45 is formed on both side surfaces of the circuit board 40 at positions corresponding to the pair of support columns 25 of the bus bar 10. The recesses 45 are formed by hollowing out semicircular shapes in mutually approaching directions from the side surface sides of the circuit board 40. The bus bar 10 is fixed to the circuit board 40 by fitting the pair of support columns 25 of the bus bar 10 into the recesses 45 of the circuit board 40.

Each of the pair of support columns 25 includes a main body part 26 that is joined at both ends of the base part 20 and abuts the surface of the circuit board 40, and a fitting part 27 that is formed to extend downwards from the main body part 26 and fits into the recess 45. The shape of the inner surface side of each fitting part 27 (surfaces on the sides of the pair of fitting parts 27 that face each other) corresponds to an outer peripheral side of the recess 45 formed in the circuit board 40.

Each fitting part 27 is formed with a cross section area that is smaller than that of the main body part 26. A stepped part 26a is formed between the main body part 26 and the fitting part 27. The stepped part 26a abuts the surface of the circuit board 40.

A positioning pin 30 that is formed to extend toward the circuit board 40 side is included at an intermediate portion in the lengthwise direction of the base part 20.

Figure 2A:
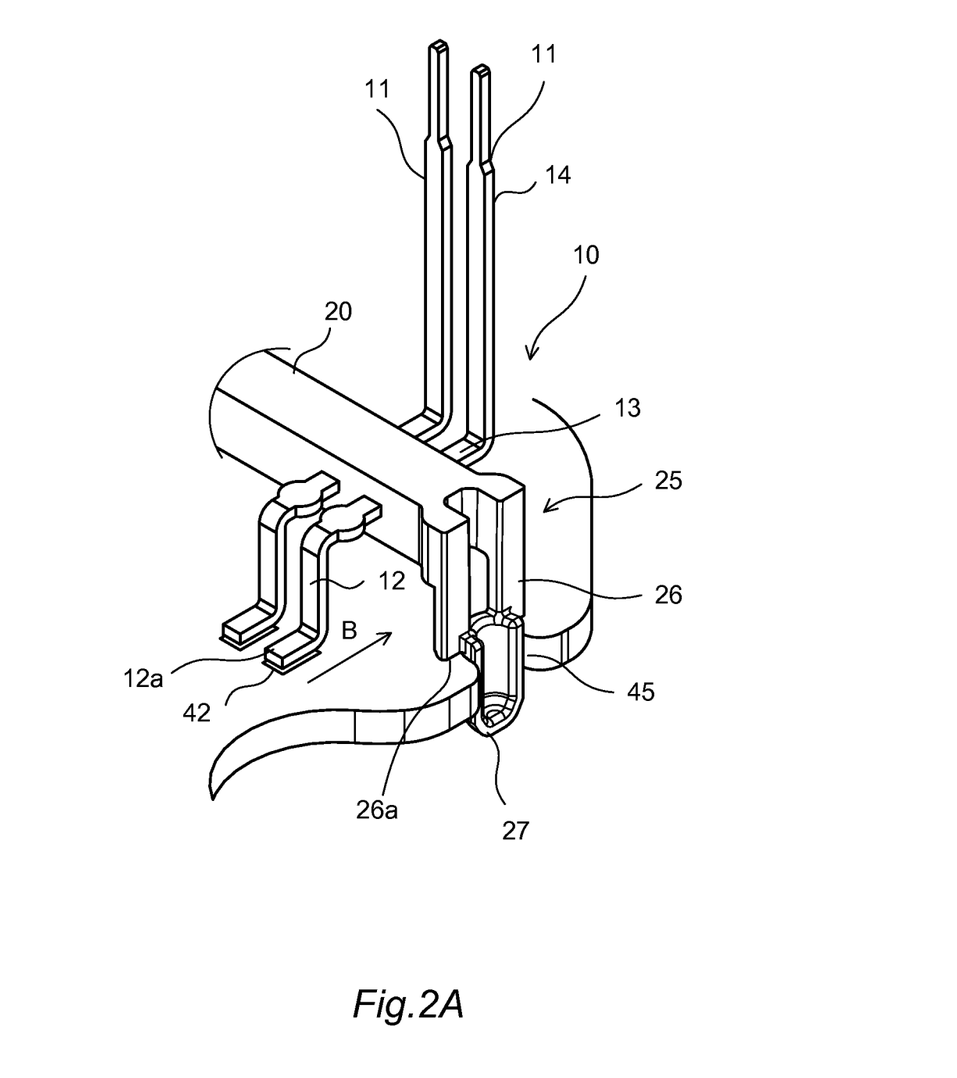
FIG. 2A is an explanatory view of the main parts of the bus bar and the circuit board of the embodiment of the present invention.
Figure 2B:
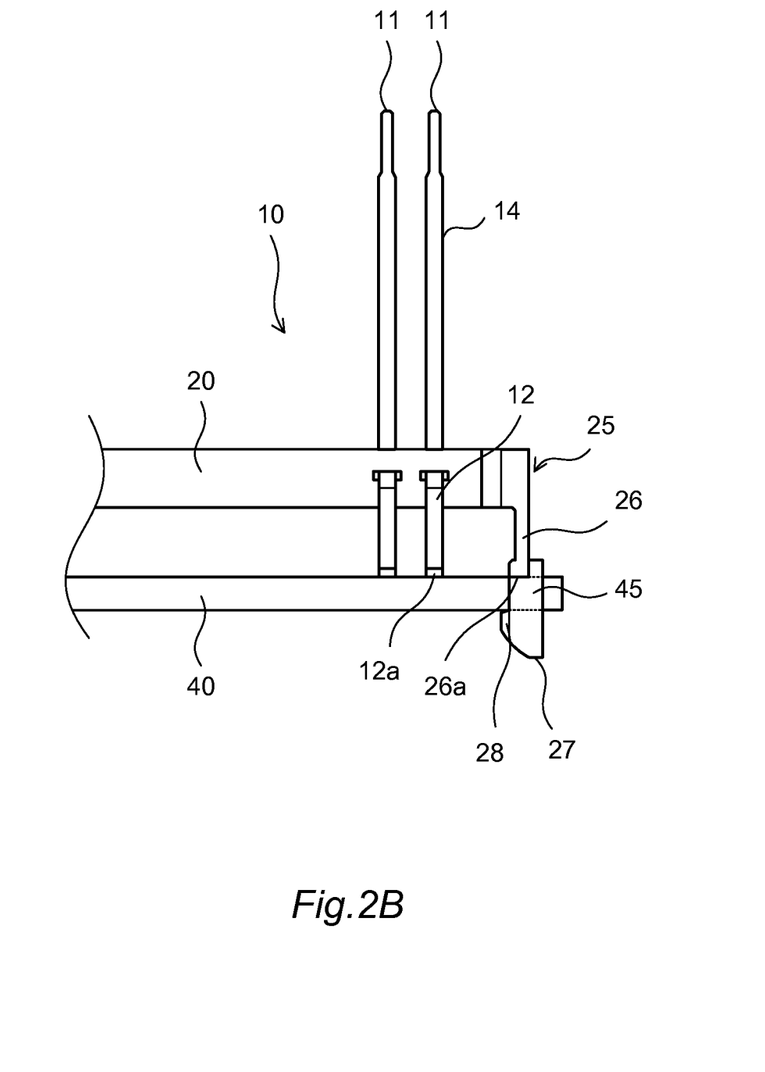
FIG. 2B is an explanatory view of the main parts of the bus bar and the circuit board of the embodiment of the present invention.

FIGS. 2A and 2B are explanatory views of the main parts of the bus bar 10 and the circuit board 40 with a focus on the support columns 25 of the embodiment of the present invention. FIG. 2A is a schematic view focused on one support column 25. FIG. 2B is a side surface perspective view from the side (when viewed from the arrow B direction) of the support column 25.

The support columns 25 are formed to extend toward the circuit board 40 side at both ends of the base part 20. Each support column 25 includes the main body part 26 and the fitting part 27. Each fitting part 27 has a shape that corresponds to the recess 45 formed in the circuit board 40. Given this constitution, the pair of fitting parts 27 that respectively extend from the pair of support columns 25 fit into the circuit board 40 from both side surface sides of the circuit board 40. Thereby, the support columns 25 clamp the circuit board 40 from both side surface sides to fix the bus bar 10 to the circuit board 40.

Pawl parts 28 formed in mutually approaching directions are respectively formed on the distal ends of the pair of fitting parts 27. The pawl parts 28 lock onto the underside surface of the circuit board 40. Given this constitution, the stepped part 26a of each support column 25 abuts the surface of the circuit board 40 and the pawl part 28 formed on the fitting part 27 engages with the underside surface side of the circuit board 40. Therefore, the stepped part 26a and the pawl part 28 grip the circuit board 40 in the board thickness direction. Thereby, the support columns 25 fix the circuit board 40 in the board thickness direction and the bus bar 10 is fixed in the board thickness direction of the circuit board 40.

Figure 3A:
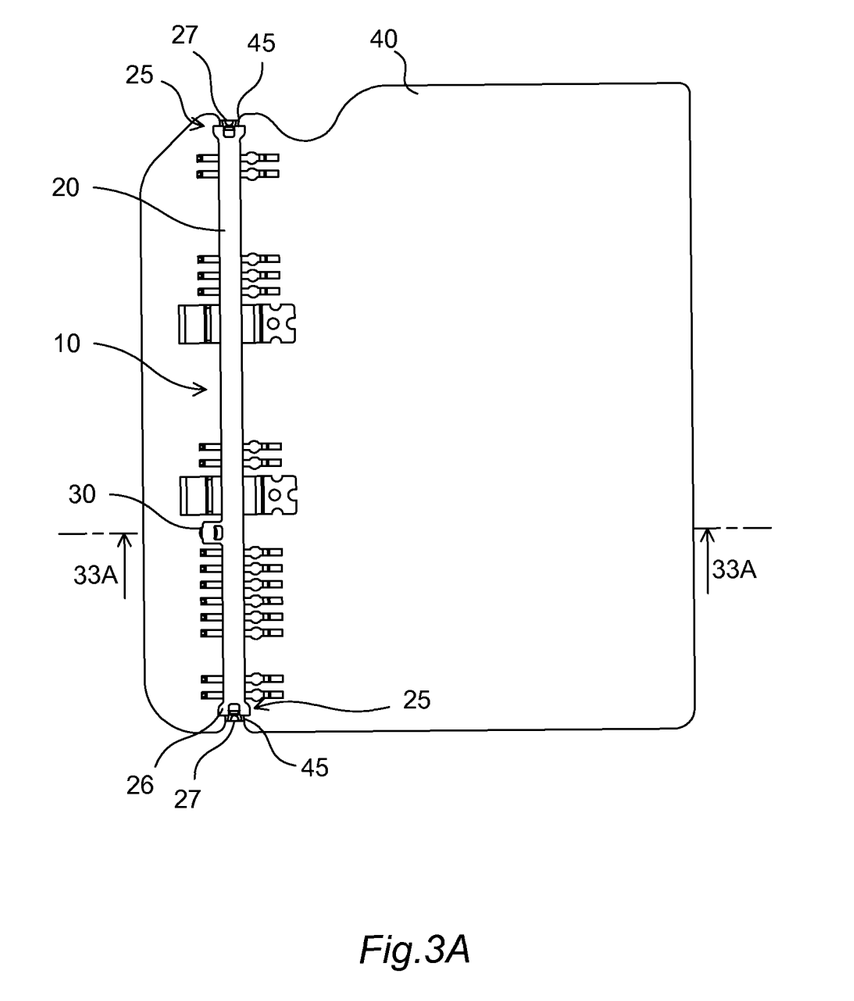
FIG. 3A is a top surface view of the circuit board onto which a bus bar is mounted of the embodiment of the present invention.
Figure 3B:
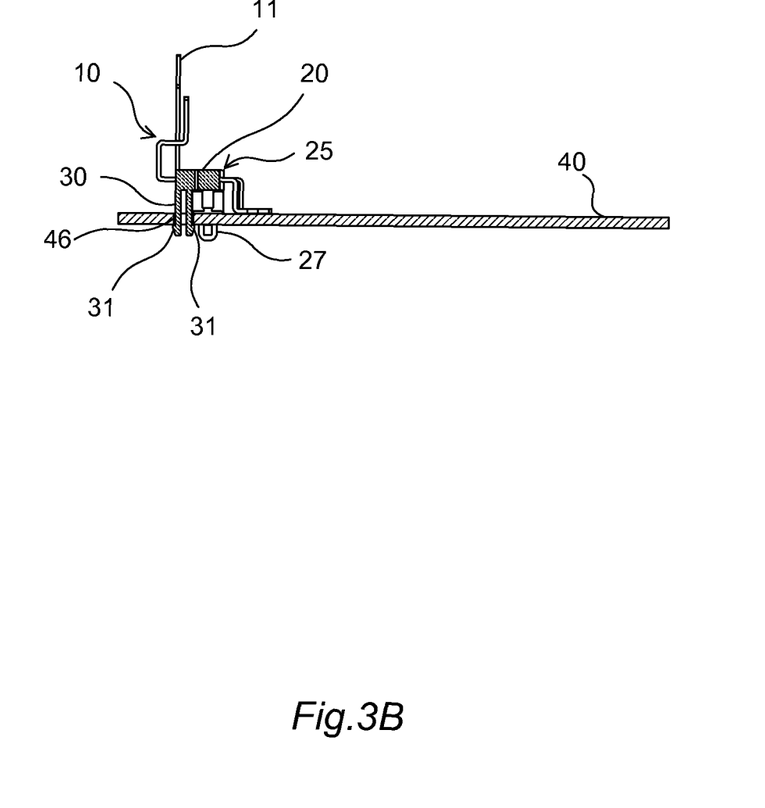
FIG. 3B is a cross-section view of the circuit board onto which a bus bar is mounted of the embodiment of the present invention.

FIGS. 3A and 3B are explanatory views of the bus bar 10 and the circuit board 40 of the embodiment of the present invention. FIG. 3A illustrates a top surface view of the circuit board 40, and FIG. 3B illustrates a cross section view along line 33A-33A shown in FIG. 3A.

The positioning pin 30 is formed at a position corresponding to a positioning hole 46 formed in the circuit board 40. When fixing the base part 20 to the circuit board 40, the positioning pin 30 is inserted into the positioning hole 46.

The positioning pin 30 has a sporked structure, and a positioning pin pawl part 31 is formed on each distal end of the sporked structure of the positioning pin 30. The positioning pin pawl parts 31 engage with the underside surface of the circuit board 40. Thereby, the positioning pin 30 is fixed to the circuit board 40.

Next, the process for mounting the bus bar 10 that is constituted as described above onto the circuit board 40 will be explained.

When mounting the bus board 10 onto the circuit board 40, first, soldering paste is applied in advance onto the lands 42 of the circuit board 40, and then a process for fixing the bus bar 10 onto the circuit board 40 on which the soldering paste has been applied is performed. In this process, the support columns 25 extending at both end sides of the base part 20 of the bus bar 10 are attached to the recesses 45 formed on both side surfaces of the circuit board 40.

In more detail, the fitting parts 27 are fitted from both side surface sides of the circuit board 40 into the recesses 45 which are cut out in semicircular shapes from the side surfaces of the circuit board 40. Thereby, the fitting parts 27 clamp the circuit board 40 from both side surface sides. Further, the pawl parts 28 engage with the circuit board 40 from the underside surface side of the circuit board 40. Thereby, the circuit board 40 is gripped in the board thickness direction by the stepped parts 26a and the pawl parts 28.

Next, the positioning pin 30 that extends at an intermediate portion of the base part 20 is fitted into the positioning hole 46 of the circuit board 40. At this time, the positioning pin pawl parts 31 at the distal end of the positioning pin 30 engage with the positioning hole 46 from the underside surface side of the circuit board 40.

The bus bar 10 is fixed to the circuit board 40 as described above. Other electronic components and the like to be mounted onto the circuit board 40 are attached with an adhesive or the like to the circuit board 40.

After the bus bar 10 has been fixed to the circuit board 40, the soldering process is carried out. In the present embodiment, the soldering process is carried out by reflow. Reflow is a process for soldering electronic components in which an electronic component such as the bus bar 10 is fixed to the circuit board 40 to which a soldering paste has been applied onto the lands 42 in advance and then the soldering is melted by heating in a reflow furnace.

In reflow, the circuit board 40 to which the bus bar 10 has been fixed is inserted into a reflow furnace. The reflow furnace heats the circuit board 40 at a temperature and for a duration suitable for melting the soldering paste.

After the completion of heating in the reflow furnace, the circuit board 40 is removed from the reflow furnace and the temperature thereof is lowered to room temperature. Thereby, the soldering process by reflow is complete, and the bus bar 10 is mounted to the circuit board 40.

Herein, the circuit board 40 of the present embodiment is constituted by a metal base material such as aluminum. Meanwhile, with regard to the bus bar 10, in order to secure the insulating properties between the bus bar pins 11 and to increase the manufacturability and mountability, the base part 20 is constituted by a resin. Therefore, the thermal expansion coefficient due to heat of the bus bar 10 is different from that of the circuit board 40.

Thus, for example, if the bus bar is fixed by screws at both ends to the circuit board as in the conventional technology, the bus bar is subjected to stress from the difference in the thermal expansion coefficients. In particular, if the thermal expansion coefficient of the base part of the bus bar is larger than the thermal expansion coefficient of the circuit board, the bus bar fixed at both ends may deform, causing an intermediate portion thereof to rise up from the circuit board. If the bus bar rises up from the circuit board, the bottom parts of the pin foot parts of the bus bar pins may rise off of the lands causing defects in the soldering.

In contrast, the bus bar 10 of the present embodiment is constituted such that the support columns 25 of the bus bar 10 clamp the circuit board 40 from both side surface sides. Given this constitution, even if the thermal expansion coefficient of the base part 20 is larger than the thermal expansion coefficient of the circuit board 40, there is room for the support columns 25 at both ends of the base part 20 to escape towards the outside of the recesses 45 of the circuit board 40. Deformation of the base part 20 can be suppressed by allowing the support columns 25 to escape to the outside, and thus the bus bar 10 can be prevented from rising up from the circuit board 40. Therefore, the bottom parts 12a of the pin foot parts 12 of the bus bar pins 11 are also prevented from rising off the lands 42, and thereby soldering defects can be prevented.

The fitting parts 27 of the bus bar 10 fit into the recesses 45 of the circuit board 40 to clamp the circuit board 40 from both side surfaces. Further, the circuit board 40 is gripped in the board thickness direction by the stepped parts 26a and the pawl parts 28. Given this constitution, the bus bar 10 can be fixed such that it cannot easily come off from the circuit board 40.

The bus bar 10 includes the positioning pin 30 at an intermediate portion thereof, and the positioning pin pawl parts 31 of the positioning pin 30 are inserted into the positioning hole 46 to lock onto the underside surface of the circuit board 40. Given this constitution, the intermediate portion of the bus bar 10 can be fixed in a direction in which it is pressed to the circuit board 40. Thus, any individual difference in the base part 20 is absorbed and the bottom parts 12a of the pin foot parts 12 are pressed to the lands 42 to adhere the bottom parts 12a to the lands 42, and thereby soldering defects can be prevented. The positioning pin 30 is preferably provided at only one location within the intermediate portion in the lengthwise direction of the base part 20, but positioning pins 30 can be provided at two or more locations therein.

Therefore, in this embodiment of the present invention, the bus bar pins 11 are fixed to the circuit board 40 by clamping the circuit board 40 with the pair of support columns 25 formed at both ends of the base part 20. Given this constitution, for example, even if the base part 20 deforms relative to the circuit board 40 due to a difference in the thermal expansion coefficients when heating the bus bar 10 and the circuit board 40 by reflow or the like, deformation of the base part 20 due to thermal expansion can be suppressed because the pair of support columns 25 which are not fixed to the circuit board 40 can escape in a direction away from the circuit board 40. Thus, the bus bar pins 11 can be prevented from rising up from the circuit board 40, and thereby defects in the soldering of the bus bar 10 can also be prevented.

In the embodiment of the present invention explained above, the fitting parts 27 are fitted into the recesses 45 formed by cutting out both side surface sides of the circuit board 40. However, the shape of the recesses 45 is not limited thereto. For example, fixing holes having an elliptical or elongated hole shape can be formed at two locations in the circuit board 40, and these two fixing holes can be clamped by the fitting parts 27. Further, the recesses 45 are also not limited to these shapes, and any shape is acceptable as long as the recesses 45 realize a structure that allows for the two support columns 25 on the base part 20 to escape toward the outside.

In addition, the circuit board 40 of the above-described embodiment of the present invention is constituted by a metallic base material. However, it can also be constituted by another material such as glass epoxy.

Embodiments of the present invention have been explained above, but these embodiments merely describe some of the applicable examples of the present invention, and the technical scope of the present invention should not be construed as limited to the specific constitutions of the embodiments described above.

This application is based on and claims priority to Japanese Patent Application No. 2012-22864 filed with Japan Patent Office on Feb. 6, 2012, all the contents of which are hereby incorporated by reference.

The exclusive properties or characteristics of the embodiments of the present invention are claimed as follows.

The invention claimed is:

1. A bus bar comprising:
   a base part disposed along a circuit board;
   a bus bar pin mounted onto the circuit board, the bus bar pin being formed integrally by
      a vertical part that extends upwards from the base part in a vertical direction relative to the circuit board,
      a pin foot part that extends downwards from the base part in a vertical direction relative to a side of the circuit board,
      a connecting part that connects the vertical part and the pin foot part, and
      a bottom part, that forms a surface that is approximately parallel to the circuit board, is formed at a bottom end of the pin foot part,
   wherein the base part supports the bus bar pin; and
   a pair of support columns formed at two opposite ends of the base part and clamp the circuit board to fix the bus bar pin to the circuit board,
   wherein:
   the support columns each include
      a main body part that is joined to the base part and abuts a surface of the circuit board,
      a fitting part that extends from the main body part and fits to circuit board, and
      a stepped part that abuts the surface of the circuit board and is formed between the main body part and the fitting part, and
   the bus bar further includes pawl parts locking onto an underside surface of the circuit board and formed at an end of each support column,
   the support columns grip the circuit board in a board thickness direction by the stepped parts and the pawl parts.

2. The bus bar according to claim 1, wherein recesses are formed on two opposite side surfaces of the circuit board, and the support columns are fittted into the recesses.

3. The bus bar according to claim 1, further comprising a positioning pin formed on the base part between the support columns, and the positioning pin is inserted into a positioning hole formed in the circuit board.

4. The bus bar according to claim 3, wherein the positioning pin includes a positioning pin pawl part locked onto the underside surface of the circuit board and is formed at a distal end of the positioning pin.

5. The bus bar according to claim 1, wherein a part of the fitting parts that extends through the circuit board have a side surface free of direct contact with the circuit board.

6. The bus bar according to claim 1, wherein the support columns are movable in a direction away from the circuit board.

7. The bus bar according to claim 1, wherein the bottom part has a bottom surface which is parallel to the surface of the circuit board.

8. The bus bar according to claim 1, wherein the underside surface of the circuit board, is opposite to the surface the stepped parts abut.

9. The bus bar according to claim 1, wherein recesses are formed on two opposite side surfaces of the circuit board, and the support columns are fitted into the recesses so as to be movable relative to the circuit board.

\* \* \* \* \*